(12) United States Patent
Persson (10) Patent No.: US 10,836,300 B2
(45) Date of Patent: Nov. 17, 2020

(54) FASTENING DEVICE FOR DETACHABLY FASTENING OF AN OBJECT TO A VEHICLE FLOOR

(71) Applicant: HOLMBERGS SAFETY SYSTEM HOLDING AB, Halmstad (SE)

(72) Inventor: Jan-Erik Persson, Vessigebro (SE)

(73) Assignee: HOLMBERGS SAFETY SYSTEM HOLDING AB, Halmstad (SE)

( * ) Notice: Subject to any disclaimer, the term of this patent is extended or adjusted under 35 U.S.C. 154(b) by 0 days.

(21) Appl. No.: 16/484,439

(22) PCT Filed: Dec. 19, 2017

(86) PCT No.: PCT/EP2017/083482
§ 371 (c)(1),
(2) Date: Aug. 7, 2019

(87) PCT Pub. No.: WO2018/145802
PCT Pub. Date: Aug. 16, 2018

(65) Prior Publication Data
US 2019/0366905 A1 Dec. 5, 2019

(30) Foreign Application Priority Data
Feb. 8, 2017 (SE) ...................... 1750116

(51) Int. Cl.
*B60P 7/08* (2006.01)
*A61G 3/08* (2006.01)

(52) U.S. Cl.
CPC ............... *B60P 7/083* (2013.01); *A61G 3/08* (2013.01); *A61G 3/0808* (2013.01); *B60P 7/0838* (2013.01)

(58) Field of Classification Search
CPC .......... B60P 7/083; B60P 7/06; B60P 7/0838; A61G 3/08; A61G 3/0808
(Continued)

(56) References Cited

U.S. PATENT DOCUMENTS 5,282,706 A 2/1994 Anthony et al.
6,007,053 A 12/1999 Huang
(Continued)

FOREIGN PATENT DOCUMENTS

EP 2755858 A1 7/2014
WO WO-2005/039923 A2 5/2005
(Continued)

OTHER PUBLICATIONS

Swedish Search Report for Application No. 1750116-4, dated Sep. 29, 2017.
(Continued)

*Primary Examiner* — Stephen T Gordon
(74) *Attorney, Agent, or Firm* — Moser Taboada (57) ABSTRACT

The present disclosure relates to a fastening device (1) for fastening an object, such as a wheelchair, thereto. The fastening device is to be mounted on a vehicle floor. The fastening device (1) comprises an automatic locking retractor (ALR) and a manually operable lever (11) biased by a biasing member (12) to a neutral intermediate position when no manual force is applied thereto. The lever (11) being manually rotatable from the intermediate position in a first direction (A) to a tightening position and being manually rotatable from the intermediate position in a second direction (B) opposite the first direction to a release position.

13 Claims, 7 Drawing Sheets

(58) Field of Classification Search
USPC .......................... 410/7, 10–12, 23, 100, 103
See application file for complete search history.

(56) References Cited

U.S. PATENT DOCUMENTS

| | | | |
|---|---|---|---|
| 6,287,060 B1 * | 9/2001 | Girardin | ............... A61G 3/0808 |
| | | | 410/11 |
| 6,406,230 B1 | 6/2002 | Mason et al. | |
| 7,503,736 B1 | 3/2009 | Chen | |
| 2009/0016836 A1 | 1/2009 | Girardin et al. | |
| 2009/0047091 A1 | 2/2009 | Huck | |
| 2014/0117137 A1 | 5/2014 | Diamond | |
| 2014/0271020 A1 * | 9/2014 | Girardin | ............... B60P 7/0823 |
| | | | 410/23 |

FOREIGN PATENT DOCUMENTS

| | | |
|---|---|---|
| WO | WO-2015/144099 A2 | 10/2015 |
| WO | WO-2016/048154 A1 | 3/2016 |

OTHER PUBLICATIONS

International Search Report for Application No. PCT/EP2017/083482, dated Apr. 10, 2018.

* cited by examiner

# FASTENING DEVICE FOR DETACHABLY FASTENING OF AN OBJECT TO A VEHICLE FLOOR

TECHNICAL FIELD

The present disclosure relates to a fastening device for detachably fastening of an object, such as a wheelchair, thereto. The fastening device is to be mounted on an interior surface of a vehicle, such as a vehicle floor.

TECHNICAL BACKGROUND

When transporting a wheelchair in a motor vehicle, the wheelchair must be restrained in the vehicle to prevent movement of the wheelchair while the vehicle is in motion, such as at acceleration or braking. A restraint system of several fastening devices is normally used. Each fastening device normally includes a tension strap, such as a web strap (webbing), arranged to be wound onto a spool as it rotates. Each tension strap is provided with attachment means configured to enable fastening to the wheelchair. Moreover, each fastening device is normally attached to the floor of the vehicle in order to allow for easy stowing of the wheelchair. Such wheelchair securement system is also referred to as wheelchair tie-down system.

U.S. Pat. No. 6,406,230 B1 relates to a tensioning apparatus comprising an actuator which may include a pedal raised in the start position and depressed in the finish position.

Further examples of wheelchair securement systems are described in US 2009/0016836 A1, WO 2016/048154 A1 and WO 2015/144099 A1.

A wheelchair securement system should be easy to use and must ensure safe and secure mounting of the wheelchair in the vehicle. Thus, the fastening device has to be securely locked to the wheelchair during transportation of the wheelchair.

The fastening device used in this type of securement system normally comprises an automatic locking retractor (ALR) in which the retractor is automatically locked once the tension strap has been extended from the automatic locking retractor and thereafter allowed to retract to the desired length. The automatic locking retractor may be unlocked by manual operation of a release mechanism.

In order to ensure that the wheelchair is safely secured, it is desired to enable further tightening of the tension strap in order to take up any slack after the automatic locking retractor has been locked. Normally, this tightening is performed by manually turning a hand-wheel arranged on one or both sides of the automatic locking retractor which thereby turns a spool in the retractor and further rewinds the tension strap. However, this tightening operation may be cumbersome and laborious since the hand-wheels are located near the floor of the vehicle and it may be difficult to reach for the person stowing and securing the wheelchair. If the person securing the wheelchair (herein called the user) is unable to tighten the tension straps sufficiently, the transportation of the wheelchair in the vehicle may be a traffic hazard. It may also be difficult for the person removing the wheelchair from the vehicle to reach the release mechanism located near the floor of the vehicle in order to unlock the automatic locking retractor.

Thus, there is room for improvement of these operations and a need for a more user-friendly and convenient system in order to facilitate and ensure safe mounting of loose objects, such as wheelchairs, in vehicles.

SUMMARY OF THE INVENTION

The present disclosure relates to a fastening device for detachably fastening of an object, such as a wheelchair, thereto, the fastening device having a mountable base portion for mounting on an interior surface of a vehicle, such as a vehicle floor, and the device comprises an automatic locking retractor (ALR).

The automatic locking retractor comprises a spindle being rotatable around a transverse axis. The spindle may be rotatably arranged around a shaft extending along the transverse axis. The spindle supports a tension strap, which is connected at a captive end thereof to the spindle. The tension strap may be provided at a free end thereof with attachment means configured to enable fastening to the object, such as a wheelchair. The tension strap is arranged to be wound onto the spindle as the spindle rotates in a rewinding direction, and the tension strap is arranged to be unwound from the spindle as the spindle rotates in an unwinding direction opposite to the rewinding direction. The spindle is tensioned in the rewinding direction, such as by resiliency of a spring.

The automatic locking retractor further comprises an automatic locking mechanism for selectively locking the spindle. The automatic locking retractor has an unlocked mode in which the spindle of the automatic locking retractor is freely rotatable in both the rewinding direction and the unwinding direction, and a locked mode in which the spindle is prevented by the automatic locking mechanism from rotating in the unwinding direction while being freely rotatable in the rewinding direction.

The fastening device further comprises a manually operable lever connected to the automatic locking retractor and pivotally arranged around the transverse axis. The manually operable lever is biased by a biasing member to a neutral intermediate position when no manual force is applied thereto. The manually operable lever may be biased by a spring, such as a helical torsion spring, to the neutral intermediate position.

The lever is manually rotatable from the intermediate position in a first direction to a tightening position thereby forcing the spindle when in the locked mode to rotate further in the rewinding direction and allow tightening of the tension strap. The tightening procedure takes up the slack of the tension strap. Moreover, the lever is manually rotatable from the intermediate position in a second direction opposite the first direction to a release position thereby unlocking the automatic locking retractor.

Thus, both tightening and release of the tension strap are conveniently enabled by the multi-functional manually operable lever.

The manually operable lever may advantageously be arranged such that the lever is rotated in the second direction to the release position when the lever is rotated away from the mountable base portion of the device. Thus, when the fastening device is mounted on a vehicle floor, the lever is lifted up in a direction away from the vehicle floor. This configuration reduces the risk for accidental unlocking of the automatic locking retractor by, for instance, putting a bag on the fastening device or unintentionally stepping on the fastening device.

Moreover, the manually operable lever may advantageously be arranged such that the lever is rotated in the first direction to the tightening position when the handle portion is rotated towards the mountable base portion of the device.

Thus, when the fastening device is mounted on a vehicle floor, the lever is pushed down in a direction towards the vehicle floor. This configuration allows for easy operation by foot (or hand if desired) of the user when further tightening of the tension strap is desired after the automatic locking retractor has been locked. Tightening of the tension strap by foot enables easier application of a greater force and is more convenient than by manually turning a hand-wheel arranged on the side of the automatic locking retractor.

Thus, the fastening device as disclosed herein facilitates safe and secure mounting of a loose object, such as a wheelchair, in the vehicle.

The tension strap when wound on the spindle may form a coil having a perimeter, a lower section of the perimeter facing the mountable base portion and an upper section of the perimeter facing away from the mountable base portion, the tension strap leaving and entering the coil from the upper section of the perimeter of the coil as the spindle rotates.

The automatic locking retractor may further comprise a switch having a first position for deactivating the automatic locking mechanism in response to the tension strap being pulled when fully wound on the spindle, and a second position for activating the automatic locking mechanism in dependence upon a predetermined amount of tension strap being rewound onto the spindle.

The spindle may be rotatably arranged around a shaft extending along the transverse axis, the shaft holding the spindle in a retractor frame.

The spindle may comprise at least one cogwheel arranged at an end of the spindle. In particular, the spindle may comprise a first cogwheel and a second cogwheel arranged at respective ends of the spindle. Each cogwheel comprises evenly spaced teeth.

The automatic locking retractor may further comprise a ratchet mechanism being displaceable between an engagement position where the ratchet mechanism is engaged with the cogwheel(s) thereby providing locking of the automatic locking retractor, and a disengagement position where the ratchet mechanism is disengaged from the cogwheel(s) thereby providing unlocking of the automatic locking retractor. In the locked mode of the automatic locking retractor, the spindle is prevented by the ratchet mechanism being in the engagement position from rotating in the unwinding direction while being freely rotatable in the rewinding direction.

When the spindle comprises a first and a second cogwheel, the ratchet mechanism may be displaceable between an engagement position and a disengagement position with the first cogwheel and the second cogwheel for locking and unlocking rotation of the spindle.

The manually operable lever may comprise a handle portion and a base portion, where the base portion may be connected to the shaft around which the spindle may be rotatably arranged. In particular, the base portion comprises a first base portion and a second base portion.

The base portion of the lever may comprise at least one protrusion arranged to push the ratchet mechanism to disengage from the cogwheel(s) of the spindle while manually moving the handle portion of the lever in the second direction to the release position, thereby unlocking the automatic locking retractor and thus allowing the tension strap to be pulled out.

The base portion of the lever may be connected to a pawl mechanism arranged to engage the cogwheel(s) while manually moving the handle portion of the lever in the first direction to the tightening position, thereby forcing the spindle when the automatic locking retractor is in the locked mode to rotate further in the rewinding direction and allow tightening of the tension strap.

The retractor frame of the automatic locking retractor may comprise two spaced apart side portions between which the shaft extends. Each side portion may have a front profile with a recess.

The pawl mechanism may comprise an elongated plate member extending in parallel to the transverse axis of the shaft and resting on each front profile of the side portions of the frame. The elongated plate member may be arranged to slide on each front profile of the side portions to reach the recess thereof while manually moving the handle portion of the lever in the first direction to the tightening position thereby allowing the elongated plate member to engage the cogwheel(s).

The base portion of the lever may comprise a first protrusion arranged to further tension the biasing member while manually moving the lever in the first direction to the tightening position, and a second protrusion arranged to push the ratchet mechanism to disengage from the cogwheel(s) of the spindle while manually moving lever in the second direction to the release position. The first and second protrusion may extend in a direction parallel to the transverse axis of the shaft from an interior side of the base portion towards the cogwheel of the spindle.

The base portion of the lever may comprise a recess on an interior side thereof, the recess providing a first and a second edge, where the first edge is arranged in proximity to the first protrusion and the second edge is arranged further away from the first protrusion. The first edge may be arranged to further tension the biasing member while manually moving the lever in the second direction to the release position. The recess may extend in a direction parallel to the transverse axis of the shaft from an interior side of the base portion away from the cogwheel of the spindle.

The biasing member, which biases the manually operable lever to the neutral intermediate position, may be a helical torsion spring having a first leg and second leg, where the first protrusion may be arranged to push on the first leg of the helical torsion spring while manually moving the lever in the first direction to the tightening position, and the first edge may be arranged to push on the second leg of the helical torsion spring while manually moving the lever in the second direction to the release position.

DETAILED DESCRIPTION

As used herein, the term "manually operable" means operation by a user, such as by foot or hand.

Figure 1:
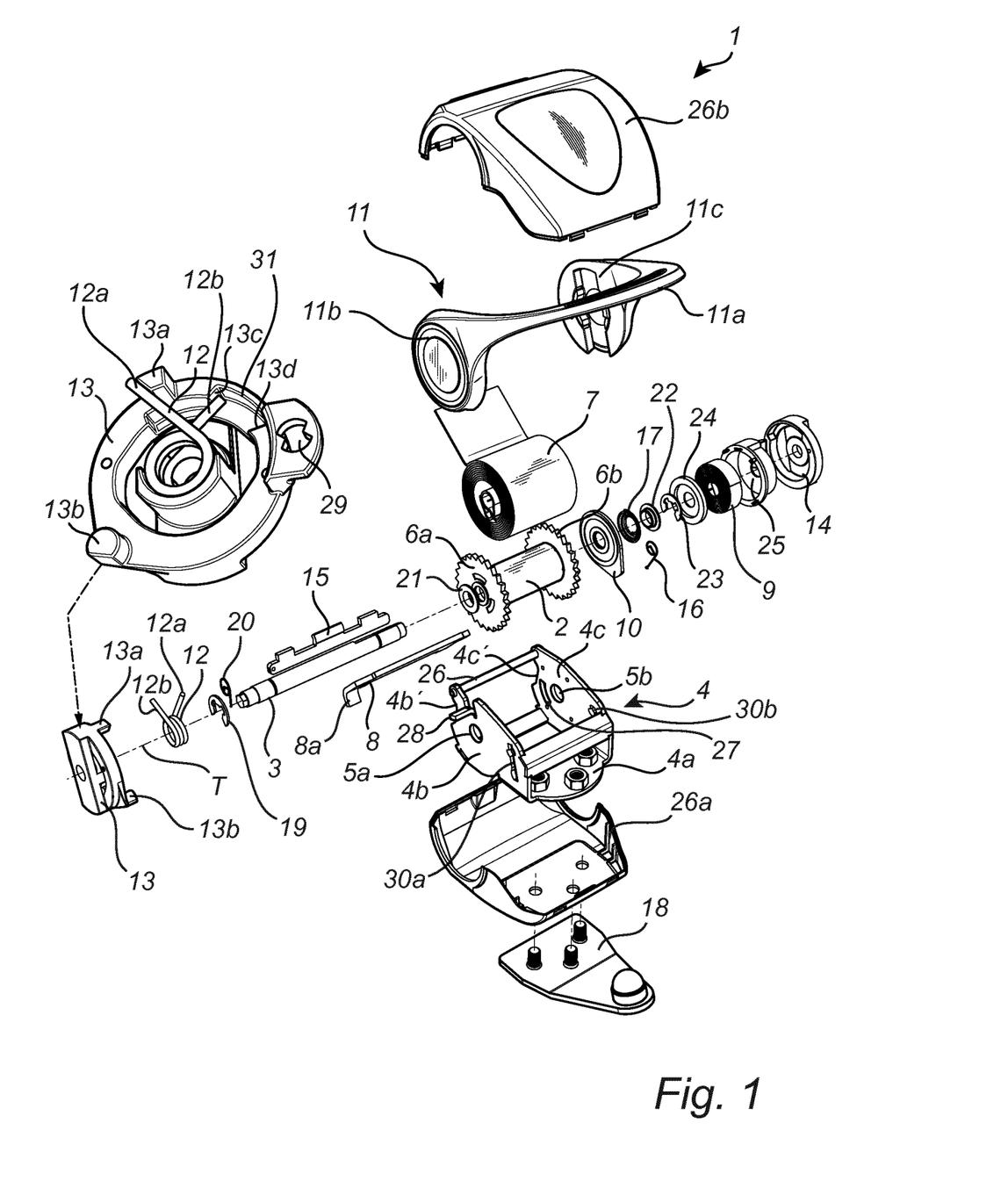
FIG. 1 is an exploded view of an embodiment of a fastening device as disclosed herein.

FIG. 1 shows the components of an embodiment of a fastening device 1 for fastening of an object (not shown), such as a wheelchair. The fastening device has a mountable base portion 18 for mounting on an interior surface of a vehicle, such as a vehicle floor, and the fastening device comprises an automatic locking retractor (ALR) as described in more detail hereinafter.

The fastening device may be mounted directly on the interior surface of the vehicle or the device may be fastened to a rail mounted on the interior surface. In case the fastening device is fastened to a rail, the device may be movable along the rail in order to adjust its position on the interior surface.

The automatic locking retractor comprises a spindle 2 rotatably arranged around a shaft 3 extending along a transverse axis T. The shaft 3 holds the spindle 2 in a retractor frame 4. In the embodiment shown in FIG. 1, the retractor frame 4 of the automatic locking retractor comprises a bottom plate 4a and a pair of spaced apart, parallel side portions 4b, 4c projecting upwardly from the bottom plate 4a. The shaft 3 extends between the two spaced apart side portions 4b, 4c of the retractor frame 4 and thereby holds the spindle 2 between the two spaced apart side portions 4b, 4c of the retractor frame 4. Each side portion 4b; 4c comprises an opening 5a; 5b through which the shaft 3 passes and thereby is held in place. As shown in FIG. 1, each side portion 4b, 4c has a front profile 4b', 4c' with a recess.

A first section of the mountable base portion 18 may be arranged to extend in a first plane parallel to the surface on which it is mounted. Moreover, as shown in FIG. 1, a second section of the mountable base portion 18 may be angled in relation to the first section. This means that when the fastening device 1 is mounted on a surface, the bottom plate 4a of the retractor frame 4 will have a planar extension angled in relation to the surface on which the device is mounted. Alternatively, the entire mountable base portion 18 may be arranged to extend in a plane parallel to the surface on which it is mounted.

The spindle 2 comprises a first cogwheel 6a and a second cogwheel 6b arranged at respective ends of the spindle 2. The cogwheels 6a, 6b of the shown embodiment are integral with the spindle 2, but the cogwheels may also be provided as separate elements mounted on the spindle.

A captive end of a tension strap 7 is connected to the spindle 2. Attachment means (not shown) may be provided at a free end of the tension strap 7. The attachment means may be configured to enable fastening to the object, such as a wheelchair, in order to secure the object in a vehicle. One or more, such as four, fastening devices as disclosed herein may be arranged on the vehicle floor.

Figure 2A:
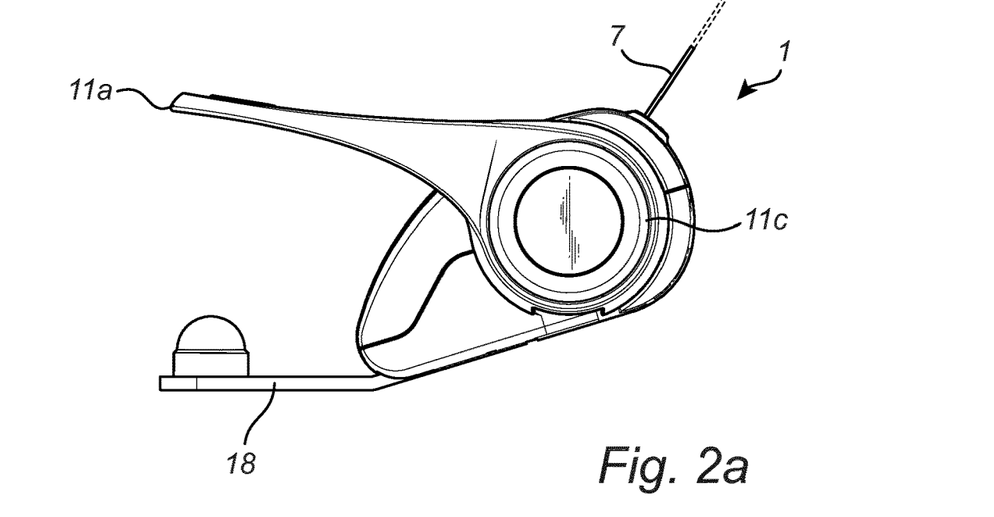
FIGS. 2a-e illustrate the fastening device in a neutral intermediate position.
Figure 2B:
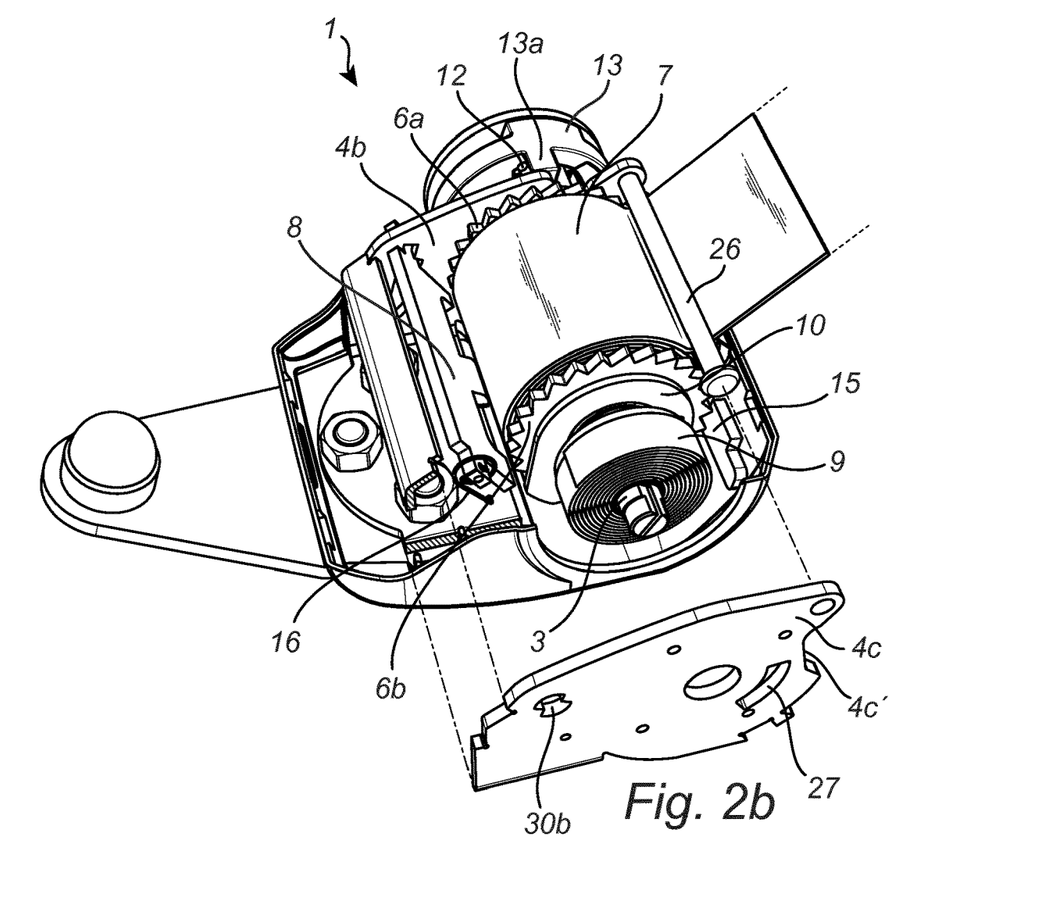
Figure 2C:
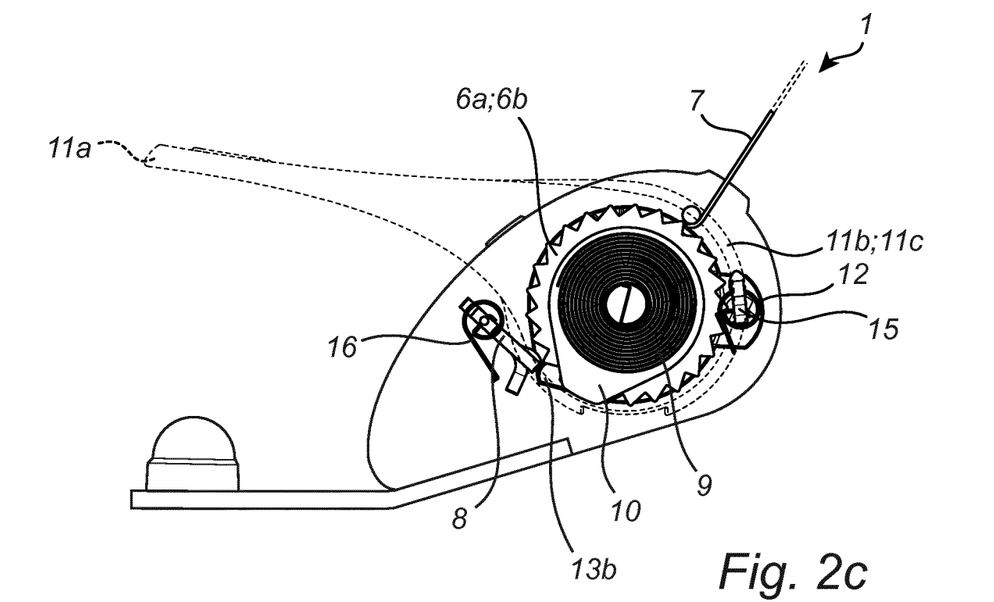
Figure 2D:
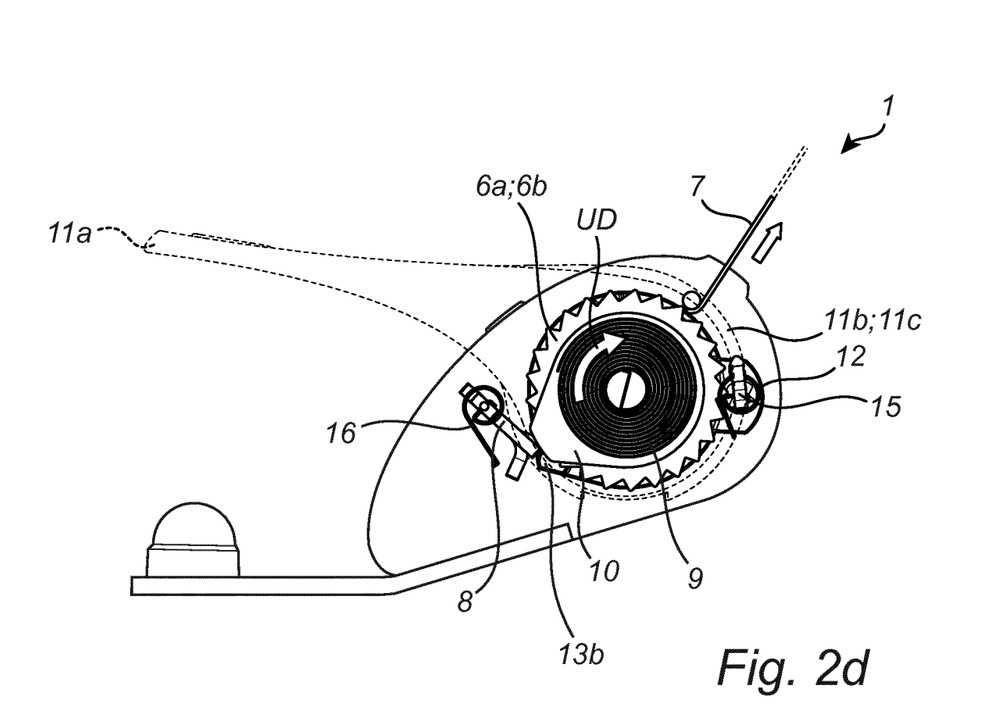
Figures 3A, 3B:
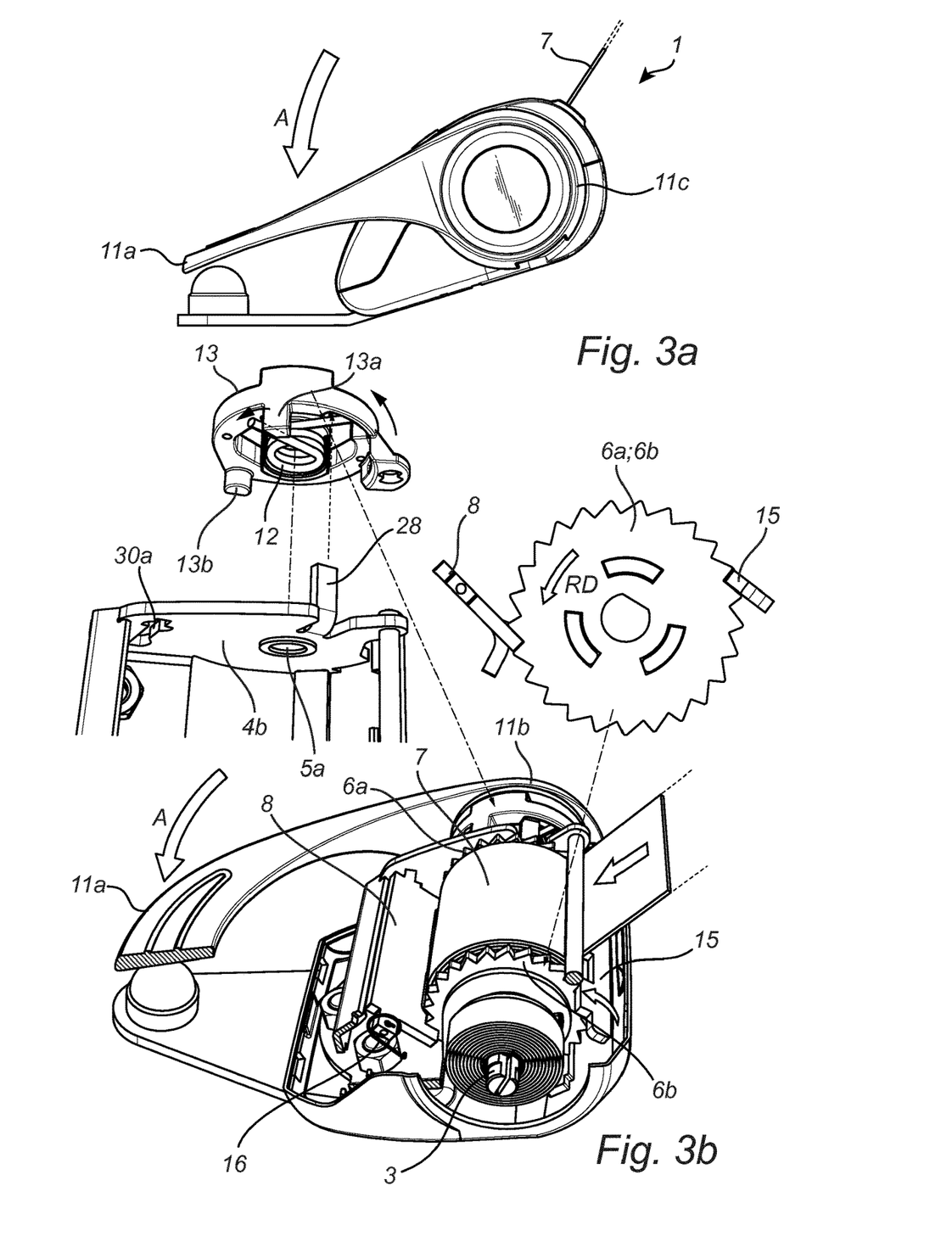
FIGS. 3a-b illustrate the fastening device in a tightening position.

The tension strap 7 is wound onto the spindle 2 as the spindle 2 rotates in a rewinding direction RD; see FIG. 3b, and the tension strap is unwound from the spindle as the spindle rotates in an unwinding direction UD opposite to the rewinding direction (RD); see FIG. 2d.

As shown in FIG. 1, the tension strap 7 forms a coil when wound on spindle 2. The coil has perimeter, where a lower section of the perimeter faces the mountable base portion 18 and an upper section of the perimeter faces away from the mountable base portion, the tension strap 7 leaving and entering the coil from the upper section of the perimeter of the coil as the spindle 2 rotates, i.e. distant from the mountable base portion 18. By arranging the coil in this manner, the tension strap 7 may be tightened by pushing down the lever 11 towards the mountable base portion 18 as further described hereinafter.

In the embodiment shown in FIG. 1, a guiding rod 26 is arranged between and connected to the two spaced apart side portions 4b, 4c of the retractor frame 4. The direction in which the tension strap 7 leaves and enters the coil forms an angle with the surface on which the fastening device is mounted. The positioning of the guiding rod 26 together with the angled mountable base portion 18 affects the angle. When fastening a wheelchair, this configuration is advantageous. In case other objects than a wheelchair is to be fastened by the fastening device, the entire mountable base portion 18 may be arranged to extend in a plane parallel to the surface on which it is mounted.

The automatic locking retractor further comprises a ratchet mechanism 8; herein also referred to as locking plate. The ratchet mechanism 8 is displaceable between an engagement position where the ratchet mechanism 8 is engaged with the first cogwheel 6a and the second cogwheel 6b for locking rotation of the spindle 2 thereby providing the automatic locking mechanism of the retractor and a disengagement position where the ratchet mechanism 8 is disengaged from the cogwheels 6a, 6b. The ratchet mechanism 8 is biased towards the engagement position, i.e. towards engagement with the cogwheels 6a, 6b, by a spring 16. Spring 16 is herein also referred to as the second spring. When assembling the automatic locking retractor shown in FIG. 1, the ratchet mechanism 8 is inserted in a slot 30a of side portion 4b and in an aperture 30b of side portion 4c. Slot 30a is configured as a slot to enable the insertion of the ratchet mechanism 8. When in place, the ratchet mechanism 8 is held in an upper aperture of slot 30a as shown in FIG. 1 and FIG. 2b.

The automatic locking retractor has an unlocked mode in which the spindle 2 of the automatic locking retractor is freely rotatable in both the rewinding direction RD and the unwinding direction UD, and a locked mode in which the spindle 2 is prevented by the ratchet mechanism 8 from rotating in the unwinding direction UD while being freely rotatable in the rewinding direction RD. The spindle 2 is tensioned in the rewinding direction RD. In the shown embodiment, the spindle 2 is tensioned in the rewinding direction RD by resiliency of a power spring 9. Power spring 9 is herein also referred to as the third spring.

The ALR further comprises a switch 10. The switch 10 is forced by a spring, such as a conical compression spring 17, against the cogwheel 6b of the spindle 2, which means that the switch 10 will rotate together with the spindle 2 due to friction between these two components. Spring 17 is herein also referred to as the fourth spring. A protrusion (hidden in the view of FIG. 1) on the switch 10 extends into a switch slot 27 of the side portion 4c. Thus, rotation of the switch 10 is restricted by slot 27. When the protrusion of the switch 10 has reached an end of the slot 27, further rotation of the switch 10 is prevented.

Pulling of the tension strap 7, and thereby unwinding the tension strap 7 from the spindle 2, when tension strap 7 is fully wound on the spindle 2 (i.e. fully retracted), causes the spindle 2 to rotate in the unwinding direction UD and the switch 10 to dislocate to its activated state, i.e. the switch 10 being in a first position. The switch 10 is thus activated and blocks the ratchet mechanism 8 from engaging the cogwheels 6a, 6b when the tension strap 7 is pulled and thereby extended from the ALR. When the tension strap 7 is fully wound on the spindle 2, the ratchet mechanism 8 is in a position where the switch 10 may dislocate to its activated state and block the ratchet mechanism 8 from engaging the cogwheels 6a, 6b. Thus, the switch may only reach the position where it blocks the ratchet mechanism 8 when the tension strap 7 is fully wound on the spindle 2 and the tension strap is pulled.

When the desired length of the tension strap 7 has been reached and the pulling force on the tension strap 7 is removed, the spring 9 biases the spindle 2 in the rewinding direction RD and the switch 10 is thus transferred back to a deactivated state, i.e. the switch 10 being in a second position, thereby allowing the ratchet mechanism 8 to engage the cogwheels 6a, 6b as a result of the bias of spring 16. The automatic locking retractor is thereby locked and it is no longer possible to pull out the tension strap 7 from the ALR any further. When the ALR is in the locked mode, further retraction of the tension strap 7 by rotation of the spindle 2 in the rewinding direction RD is still possible.

Thus, the switch 10 has a first position for deactivating the automatic locking mechanism, i.e. blocking the ratchet mechanism 8 from engaging the cogwheels 6a, 6b, when the tension strap 7 is pulled from a fully wound spindle 2, and a second position for activating the automatic locking mechanism in dependence upon a predetermined amount of tension strap 7 being rewound onto the spindle 2.

The components of the automatic locking retractor may be formed from any suitable wear-resistant material. For instance, this material may be a plastic material, such as glass-fiber reinforced polypropylene, or a metallic material, such as stainless steel.

The fastening device 1 further comprises a manually operable lever 11 pivotally arranged around the transverse axis T of the shaft 3 and operatively connected to the automatic locking retractor. The manually operable lever 11 comprises a handle portion 11a and a first 11b, 13 and a second base portion 11c, 14. In the illustrated embodiment, each of the first 11b, 13 and second base portions 11c, 14 includes a portion 11b; 11c integral with the handle portion 11a of the lever and a separate lever boss 13; 14 attached to each side of part 11b, 11c thereby forming the respective base portion 11b, 13 and 11c, 14. Alternatively, each lever boss 13; 14 may be integral with the respective portion 11b; 11c of the lever 11.

In the illustrated embodiment, the first 11b, 13 and second base portions 11c, 14 are connected to the shaft 3. In particular, the respective end of shaft 3 is inserted in an aperture of the respective lever boss 13; 14 as illustrated in FIG. 1.

The manually operable lever 11 is held by a biasing member, such as a spring 12, in a neutral intermediate position when no manual force is applied thereto. In particular, the spring 12 is a helical torsion spring having a first 12a and a second leg 12b. Spring 12 is herein referred to as the first spring.

The side portion 4b comprises a protruding part 28 which is arranged between the first leg and the second leg of the helical torsion spring 12 (see FIG. 3b). The protruding part 28 of the side portion 4b prevents the spring 12 from rotating when the handle portion 11a of the lever 11 is moved in the first direction A or the second direction B.

When the fastening device of the disclosed embodiment is mounted on a vehicle floor, the handle portion 11a when in the neutral intermediate position extends in a plane essentially parallel to the vehicle floor.

The first base portion 11b, 13 comprises a first and a second protrusion 13a, 13b. These two protrusions 13a, 13b extend in a direction parallel to the transverse axis T of the shaft 3 from an interior side of the first base portion 11b, 13 towards the first cogwheel 6a of the spindle 2. In the shown embodiment, each of the first and the second protrusions 13a, 13b is arranged adjacent the outer perimeter of the lever boss 13.

The second protrusion 13b is arranged to push the ratchet mechanism 8 to disengage from the cogwheel 6a of the spindle 2 when the handle portion 11a of the lever 11 is moved to the release position as further described below.

When the handle portion 11a is moved in either the first direction A or the second direction B, each base portion 11b, 13; 11c, 14 rotates as well.

The first protrusion 13a is arranged to push on a first leg 12a of the spring 12 (as shown in FIG. 3b) and thereby further tension the spring 12 when the handle portion 11a of the lever 11 is moved to the tightening position by manual force. When the manual force is removed from the handle portion 11a, the tensioned spring 12 returns the handle portion 11a to the intermediate position. It may be noted that a second leg 12b of the spring 12 is arranged farther away from the first cogwheel 6a of the spindle 2 than the first leg 12a of the spring 12.

In addition, the first base portion 11b, 13 comprises a recess 31 adjacent the outer perimeter of the lever boss 13. The recess 31 extend along a section of the outer perimeter of the lever boss 13 and in a direction parallel to the transverse axis T of the shaft 3 from an interior side of the first base portion 11b, 13 away from the first cogwheel 6a of the spindle 2. The second leg 12b of the spring 12 is arranged in this recess. The recess 31 provides a first and a second edge 13c, 13d, where the first edge 13c is arranged in proximity to the first protrusion 13a and the second edge 13d is arranged further away from the first protrusion 13a along the perimeter of the lever boss 13. The first edge 13c is arranged to push on the second leg 12b of the spring 12 and thereby tension the spring 12 when the handle portion 11a of the lever 11 is moved to the release position by manual force. When the manual force is removed from the handle portion 11a, the tensioned spring 12 returns the handle portion 11a to the intermediate position.

Instead of a recess, the first lever boss 13 may comprise a third protrusion arranged to push on the second leg 12b of the spring 12 and thereby tension the spring 12 when the handle portion 11a of the lever 11 is moved to the release position by manual force.

In the embodiment shown, the ratchet mechanism 8 comprises an elongated plate member 8, which may also be referred to as a first elongated plate member, extending in parallel to the transverse axis T of the shaft 3. The elongated plate member 8 comprises a protruding end part 8a bent away from the cogwheel 6a. The second protrusion 13b is arranged to push on this protruding end part 8a of the ratchet mechanism 8 to disengage the ratchet mechanism 8 from the cogwheel 6a (see FIG. 4c).

A pawl mechanism 15, herein also referred to as tightening plate, is arranged between and connected to each base portions 11b, 13 and 11c, 14 of the lever 11 as further described below. Thus, when the handle portion 11a of the lever 11 is moved in the first or second direction A or B, the base portions 11a, 13 and 11b, 14 rotates and the pawl mechanism which is connected thereto is moved as well. The pawl mechanism 15 is arranged to engage the cogwheels 6a, 6b while manually moving the handle portion 11a of the lever 11 to a tightening position as further described hereinafter. The pawl mechanism 15 is biased towards the cogwheels 6a, 6b, by a spring 20. Spring 20 is herein also referred to as the fifth spring. In the embodiment shown in FIG. 1, the pawl mechanism 15 is inserted in an aperture 29 of the lever boss 13 and a corresponding aperture (not shown) of lever boss 14. The shape of the aperture 29 and the corresponding aperture of lever boss 13 allows movement of the pawl mechanism 15 when the handle portion 11a is moved.

Further components of the embodiment shown in FIG. 1 are a first circlip 19, a first bearing 21, a second bearing 22, a second circlip 23, a distance plate 24, a spring house 25, first and second cover parts 26a, 26b.

The fastening device 1 of FIGS. 2a-2e shows the manually operable lever 11 in the neutral intermediate position.

In the starting position shown in FIGS. 2a-2c, the tension strap 7 is fully retracted and the switch 10 of the ALR is in deactivated mode. The ratchet mechanism 8 is in an open condition, i.e. disengaged from the cogwheels 6a, 6b, and the automatic locking retractor is unlocked. Also the pawl mechanism 15 is in an open condition, i.e. disengaged from the cogwheels 6a, 6b.

As shown in FIG. 2d, the switch 10 of the ALR is activated when the tension strap 7, which is fully wound on the spindle 2, is pulled (see arrow in FIG. 2d) and thereby extended from the ALR. The activated switch 10 prevents the ratchet mechanism 8 from engaging the cogwheels 6a, 6b. When the tension strap 7 is pulled, the spindle 2 rotates in the unwinding direction UD.

Figure 2E:
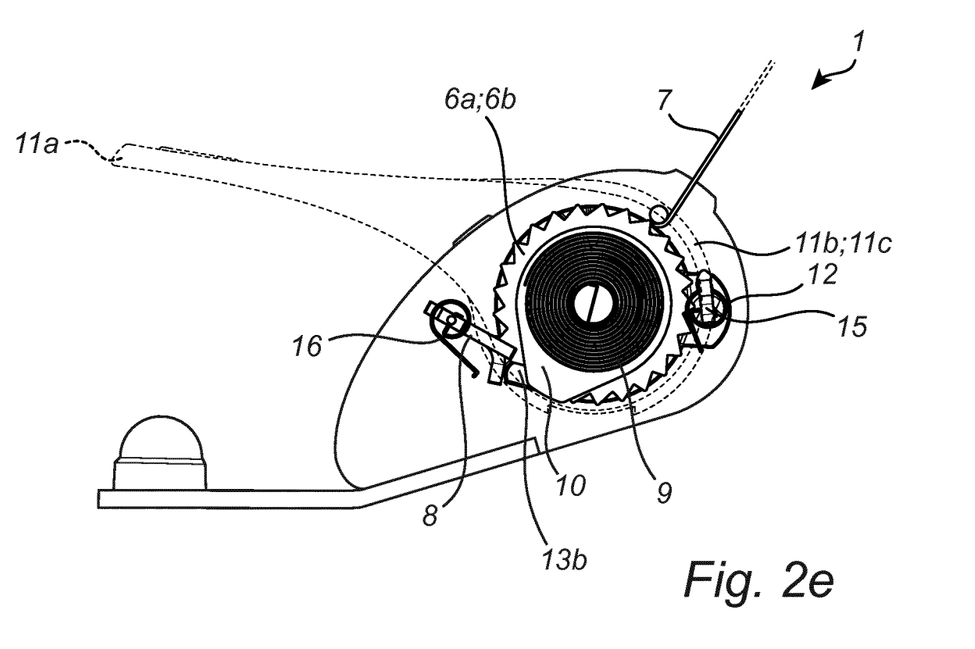

When no pulling force is exerted on the tension strap 7, the spring 9 biases the spindle 2 to rotate in the rewinding direction RD and the tension strap 7 is thus retracted. Rotation of the spindle 2 in the rewinding direction RD causes the switch 10 to rotate therewith, within the limits of the switch slot 27, and to be deactivated. The ratchet mechanism 8 is then allowed to engage the cogwheels 6a, 6b as shown in FIG. 2e. The automatic locking retractor is thereby locked and it is no longer possible to extend the tension strap 7. When the ALR is in the locked mode, retraction of the tension strap 7 by rotation of the spindle 2 in the rewinding direction RD is still possible.

The handle portion 11a of the lever 11 is manually rotatable from the intermediate position in a first direction A to a tightening position as shown in FIG. 3a. In the shown embodiment, the handle portion 11a is pushed down towards the tightening position. As shown in FIG. 3b, the pawl mechanism 15 engages the cogwheels 6a, 6b when the handle portion 11a of the lever 11 has reached the tightening position. Rotation of the lever 11 in the first direction A thereby forces the spindle 2 to rotate further in the rewinding direction RD and thus allows additional tensioning and tightening of the tension strap by applying manual force to the handle portion 11a of the lever 11. When no manual force is applied to the handle portion 11a, the handle portion 11a returns to the intermediate neutral position due to the resiliency of the spring 12. The pawl mechanism 15 disengages the cogwheels 6a, 6b when the handle portion 11a moves from the tightening position to the intermediate neutral position as further described hereinafter.

Figure 4A:
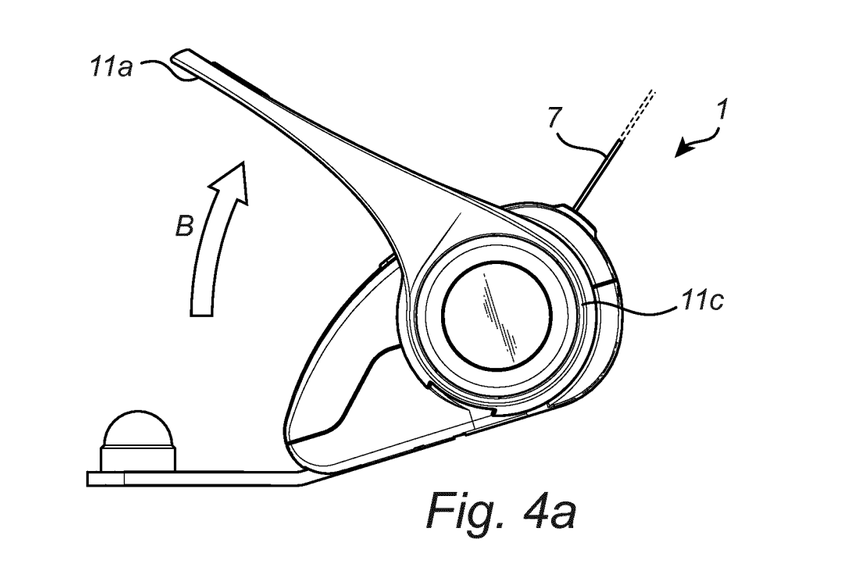
FIGS. 4a-c illustrate the fastening device in a release position.
Figure 4B:
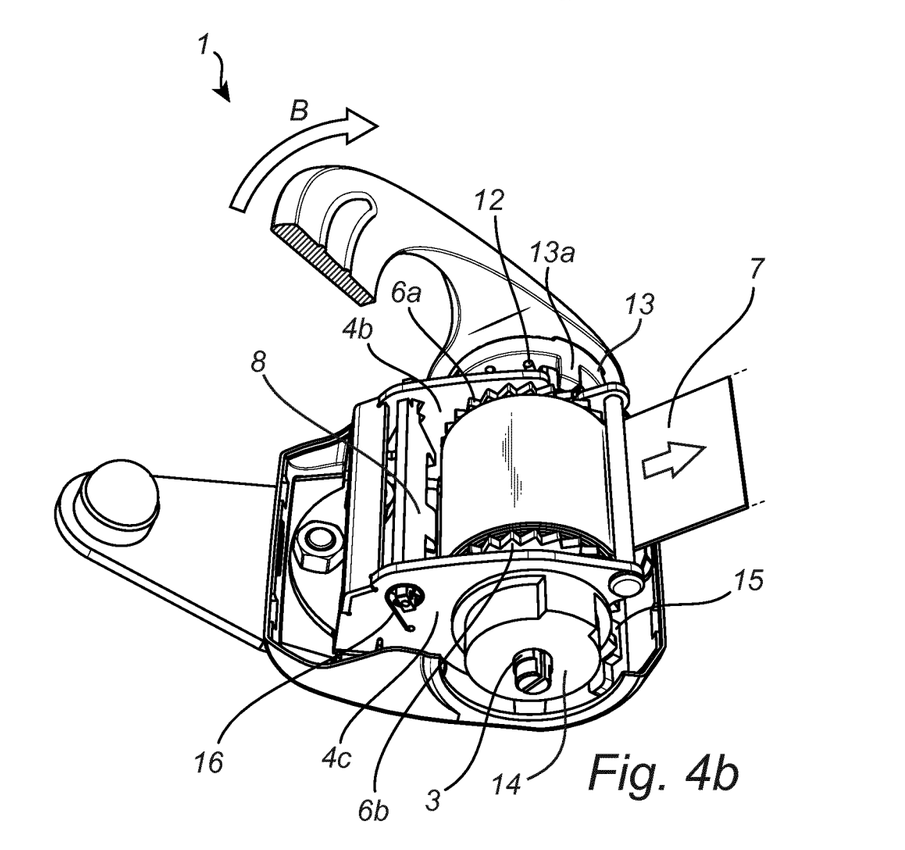
Figure 4C:
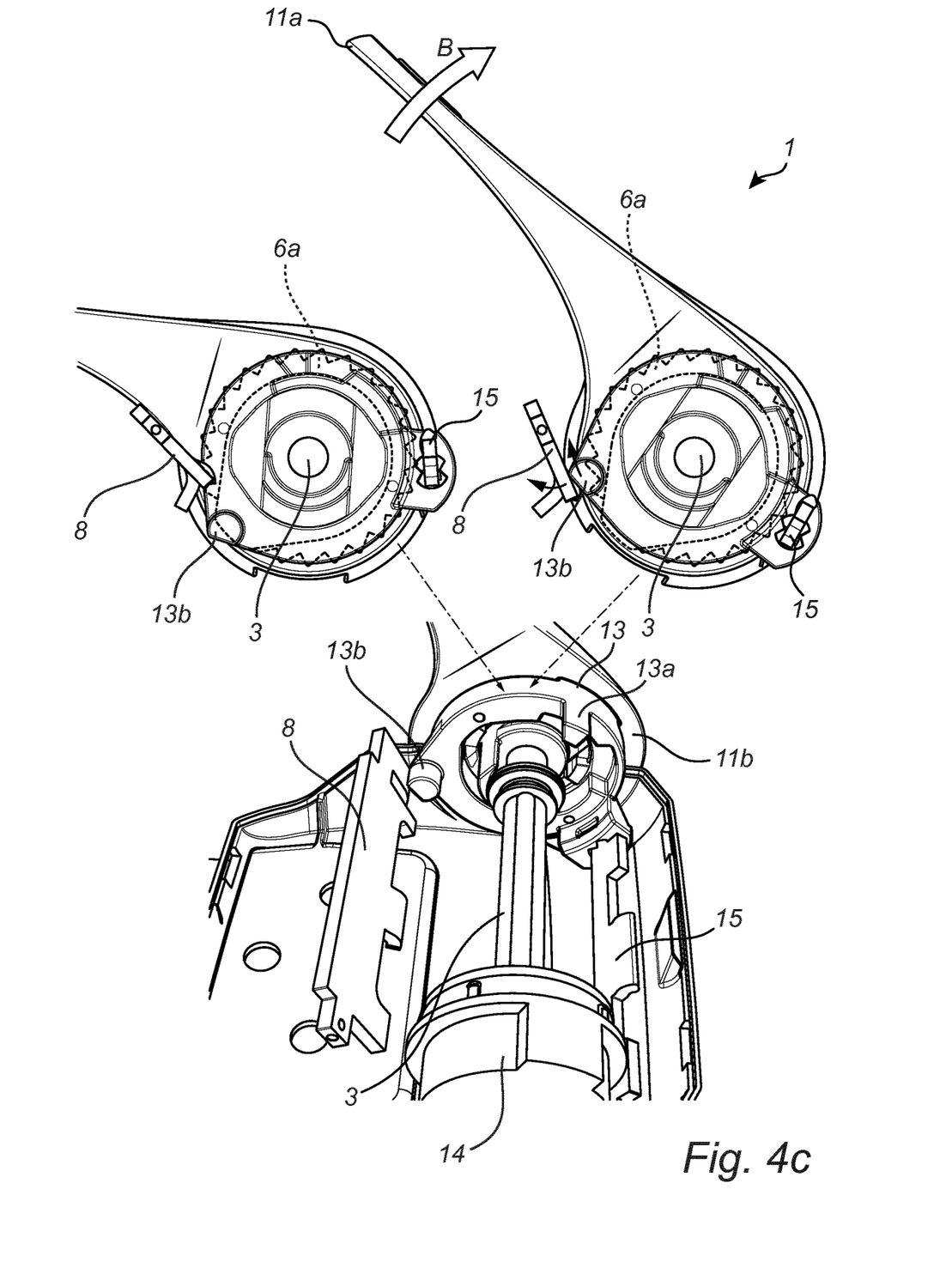

The handle portion 11a of the lever 11 is manually rotatable from the intermediate position in a second direction B opposite the first direction A to a release position as shown in FIG. 4a. In the shown embodiment, the handle portion 11a is lifted up to the release position. As shown in FIG. 4c, the second protrusion 13b of the base portion 11b, 13 of the lever 11 pushes the ratchet mechanism 8 from an engagement position where the ratchet mechanism 8 is engaged with the cogwheel 6a (illustrated in figure to the left) to a disengagement position where the ratchet mechanism 8 is disengaged from the cogwheel 6a of the spindle 2 when the handle portion 11a of the lever 11 is manually moved in the second direction B to the release position (illustrated in figure to the right). The automatic locking retractor is thereby unlocked and the tension strap 7 (not included in FIG. 4c in order to more clearly illustrate the other parts) is allowed to be either pulled in or out.

In the embodiment shown in FIG. 1, the pawl mechanism 15 comprises an elongated plate member 15, which may also be referred to as a second elongated plate member, extending in parallel to the transverse axis T of the shaft 3. The elongated plate member 15 rests on the front profiles 4b', 4c' of the side portions 4b, 4c of the frame 4 and is forced against the front profiles 4b', 4c' of the side portions 4b, 4c by spring 20. The elongated plate member 15, which is connected to the base portions 11b, 13 and 11c, 14 of the lever 11, is thus arranged to slide on the front profiles 4b', 4c' when the handle portion 11a of the lever 11 is moved. Each of the irregular front profiles 4b', 4c' comprises a recess.

When the handle portion 11a reaches the tightening position; see FIGS. 3a and 3b, the elongated plate member 15 will reach the recesses of the front profiles 4b', 4c' and the biased elongated plate member 15 is then allowed to engage the cogwheels 6a, 6b. When the handle portion 11a is returned to the intermediate position due to the tensioned spring 12, the elongated plate member 15 will leave the recesses of the front profiles 4b', 4c' and the elongated plate member 15 is no longer in a position where it can engage the cogwheels 6a, 6b. Thus, the elongated plate member 15 disengages the cogwheels 6a, 6b when the handle portion 11a is returned to the intermediate position.

While the invention has been described in detail and with reference to specific embodiments thereof, it will be apparent for one skilled in the art that various changes and modifications can be made therein without departing from the scope thereof.

The invention claimed is:

1. A fastening device for detachably fastening an object, such as a wheelchair, thereto, the fastening device having a mountable base portion for mounting on an interior surface of a vehicle, the fastening device comprising
    an automatic locking retractor comprising a spindle rotatable around a transverse axis (T), the spindle supporting a tension strap connected at a captive end thereof to the spindle, the tension strap being arranged to be wound onto the spindle as the spindle rotates in a rewinding direction (RD), and the tension strap being arranged to be unwound from the spindle as the spindle rotates in an unwinding direction (UD) opposite to the rewinding direction (RD), the spindle being tensioned in the rewinding direction (RD), the automatic locking retractor comprising an automatic locking mechanism for selectively locking the spindle, the automatic locking retractor having an unlocked mode in which the spindle of the automatic locking retractor is freely rotatable in both the rewinding direction (RD) and the unwinding direction (UD), and a locked mode in which the spindle is prevented from rotating in the unwinding direction (UD) while being freely rotatable in the rewinding direction (RD); and
    a manually operable lever connected to the automatic locking retractor and pivotally arranged around the transverse axis (T),
characterized by
    the manually operable lever being biased by a biasing member to a neutral intermediate position when no manual force is applied thereto, the manually operable lever being manually rotatable from the intermediate position in a first direction (A) to a tightening position thereby forcing the spindle when in the locked mode to rotate further in the rewinding direction (RD) and allow tightening of the tension strap, and the manually operable lever being manually rotatable from the intermediate position in a second direction (B) opposite the first direction (A) to a release position thereby unlocking the automatic locking retractor.

2. A fastening device according to claim 1, wherein the lever is arranged to be rotated away from the mountable base portion of the device when rotated in the second direction (B) to the release position.

3. A fastening device according to claim 1, wherein the lever is arranged to be rotated towards the mountable base portion of the device when moved in the first direction (A) to the tightening position.

4. A fastening device according to claim 1, wherein the tension strap when wound on the spindle forms a coil having a perimeter, a lower section of the perimeter facing the mountable base portion and an upper section of the perimeter facing away from the mountable base portion, the tension strap leaving and entering the coil from the upper section of the perimeter of the coil as the spindle rotates.

5. A fastening device according to claim 1, wherein the biasing member is a helical torsion spring having a first leg and second leg.

6. A fastening device according to claim 1, wherein the automatic locking retractor further comprises a switch having a first position for deactivating the automatic locking mechanism in response to the tension strap being pulled when the tension strap is fully wound on the spindle, and a second position for activating the automatic locking mechanism in dependence upon a predetermined amount of tension strap being rewound onto the spindle.

7. A fastening device according to claim 6, wherein
the spindle is rotatably arranged around a shaft extending along the transverse axis (T), the shaft holds the spindle in a retractor frame and the spindle comprises a cogwheel arranged at an end of the spindle, the automatic locking retractor further comprises a ratchet mechanism being displaceable between an engagement position where the ratchet mechanism is engaged with the cogwheel and a disengagement position where the ratchet mechanism is disengaged from the cogwheel, the spindle is when the automatic locking retractor is in the locked mode prevented by the ratchet mechanism being in the engagement position from rotating in the unwinding direction (UD) while being freely rotatable in the rewinding direction (RD); and the manually operable lever comprising a handle portion and a base portion, the base portion being connected to the shaft 3, the base portion of the lever comprising at least one protrusion, said protrusion being arranged to push the ratchet mechanism to disengage from the cogwheel of the spindle while manually moving the handle portion of the lever in the second direction (B) to the release position thereby unlocking the automatic locking retractor; and the base portion of the lever being connected to a pawl mechanism, the pawl mechanism being arranged to engage the cogwheel while manually moving the handle portion of the lever in the first direction (A) to the tightening position thereby forcing the spindle when the automatic locking retractor is in the locked mode to rotate further in the rewinding direction (RD) and allow tightening of the tension strap.

8. A fastening device according to claim 7, wherein the retractor frame of the automatic locking retractor comprises two spaced apart side portions, the shaft extending between the two spaced apart side portions of the retractor frame, each side portion having a front profile with a recess.

9. A fastening device according to claim 8, wherein the pawl mechanism comprises an elongated plate member extending in parallel to the transverse axis (T) of the shaft and resting on each front profile of the side portions of the frame, the elongated plate member being arranged to slide on each front profile of the side portions to reach the recess thereof while manually moving the handle portion of the lever in the first direction (A) to the tightening position thereby allowing the elongated plate member to engage the cogwheel.

10. A fastening device according to claim 7, wherein the spindle comprises a first cogwheel and a second cogwheel arranged at respective ends of the spindle, the ratchet mechanism being displaceable between an engagement position and a disengagement position with the first cogwheel and the second cogwheel for locking and unlocking rotation of the spindle.

11. A fastening device according to claim 10, wherein the base portion of the lever comprises a first protrusion arranged to further tension the biasing member while manually moving the lever in the first direction (A) to the tightening position, and a second protrusion arranged to push the ratchet mechanism to disengage from at least one of the cogwheels of the spindle while manually moving the lever in the second direction (B) to the release position, the first and second protrusion extending in a direction parallel to the transverse axis (T) of the shaft (3) from an interior side of the base portion towards the cogwheel of the spindle.

12. A fastening device according to according to claim 11, wherein the base portion of the lever comprises a recess on an interior side thereof, the recess providing a first and a second edge, where the first edge is arranged in proximity to the first protrusion and the second edge is arranged further away from the first protrusion, the first edge being arranged to further tension the biasing member while manually moving the handle portion of the lever in the second direction (B) to the release position, the recess extending in a direction parallel to the transverse axis (T) of the shaft from an interior side of the base portion away from the cogwheel of the spindle.

13. A fastening device according to according to claim 12, wherein the biasing member is a helical torsion spring having a first leg and second leg, the first protrusion being arranged to push on the first leg of the helical torsion spring while manually moving the lever in the first direction (A) to the tightening position, and the first edge being arranged to push on the second leg of the helical torsion spring while manually moving the lever in the second direction (B) to the release position.

* * * * *